United States Patent
Autenrieth et al.

(10) Patent No.: US 6,171,992 B1
(45) Date of Patent: Jan. 9, 2001

(54) TREATMENT PROCESS FOR A METHANOL REFORMING CATALYST THEREFOR

(75) Inventors: Rainer Autenrieth, Erbach; Andreas Christen, Kehr; Detlef zur Megede, Bubesheim, all of (DE)

(73) Assignee: XCELLSIS GmbH, Kirchheim/Teck-Nabern (DE)

(*) Notice: Under 35 U.S.C. 154(b), the term of this patent shall be extended for 0 days.

(21) Appl. No.: 09/097,011

(22) Filed: Jun. 15, 1998

(30) Foreign Application Priority Data

Jun. 13, 1997 (DE) .............................. 197 25 006

(51) Int. Cl.[7] .............................. B01J 20/34; B01J 38/06; C01B 3/02; C01B 3/26; C01B 31/20; H01M 8/00; B60K 8/00

(52) U.S. Cl. .................. 502/55; 252/373; 423/437.1; 423/648.1; 423/652; 429/12; 502/514; 180/54.1

(58) Field of Search .................. 252/373; 423/648.1, 423/437.1, 652; 48/61; 502/55, 514; 518/710; 585/906, 951; 429/12; 180/54.1

(56) References Cited

U.S. PATENT DOCUMENTS

| 4,676,972 | * | 6/1987 | Velenyi et al. ............. | 423/648 |
| 4,913,842 | * | 4/1990 | Yoneoka et al. ............. | 252/373 |
| 5,904,880 | * | 5/1999 | Sun ........................... | 252/373 |

FOREIGN PATENT DOCUMENTS

| 1 246 688 | 8/1967 | (DE) . |
| 158 464 | 1/1983 | (DE) . |
| 33 14 131 A1 | 10/1984 | (DE) . |
| 35 31 757 A1 | 3/1986 | (DE) . |
| 40 31 514 A1 | 4/1992 | (DE) . |
| 195 34 433 C1 | 10/1996 | (DE) . |
| 196 23 998 | * 8/1997 | (DE) . |
| 0 201 070 A2 | 11/1986 | (EP) . |
| 0 601 957 A1 | 6/1994 | (EP) . |
| 2 132 108 | 7/1984 | (GB) . |

OTHER PUBLICATIONS

Patent Abstracts of Japan, C–584, Apr. 12, 1989, vol. 13/No. 151, JP 63–310703 (A), Dec. 19, 1988, Akitoshi Seya.
Patent Abstracts of Japan, JP 04141234 A, May 14, 1992, Moriga Takuya et al.
Patent Abstracts of Japan, vol. 013, No. 151 (C–584), JP 63 310703 A, Seya Akitoshi, Dec. 19, 1988.

* cited by examiner

*Primary Examiner*—Steven P. Griffin
*Assistant Examiner*—Maribel Medina
(74) *Attorney, Agent, or Firm*—Evenson, McKeown, Edwards & Lenahan, P.L.L.C.

(57) ABSTRACT

A methanol reforming reactor includes a reforming reaction space into which a methanol reforming catalyst is charged. The methanol reforming catalyst is present at the start of the reforming reaction operation in a pre-aged state in the reforming reaction space. A process for pre-aging the methanol reforming catalyst comprises heating at a temperature of between approximately 240° C. and approximately 350° C. and at a load of between approximately 0.5 $m^3H_2$/h and approximately 50 $m^3H_2$/h per liter of catalyst material in a methanol/water atmosphere. The reactor may be used in fuel-cell-operated motor vehicles for generating hydrogen for the fuel cells by means of the water vapor reforming of methanol.

7 Claims, No Drawings

TREATMENT PROCESS FOR A METHANOL REFORMING CATALYST THEREFOR

BACKGROUND AND SUMMARY OF THE INVENTION

This application claims the priority of German Patent Document No. 197 25 006.8, filed on Jun. 13, 1997, the disclosure of which is expressly incorporated by reference herein.

The present invention relates to a methanol reforming reactor having a reforming reaction space into which a methanol reforming catalyst is charged, as well as to a process for treating a catalyst that can be used for this purpose. Such reforming reactors are used, for example, for generating hydrogen for the fuel cells of a fuel-cell-operated motor vehicle.

Methanol reforming catalysts are known in various compositions. See, for example, German Published Patent Applications DE 33 14 131 A1 and DE 35 31 757 A1, European Published Patent Application EP 0 201 070 A2 and Japanese Published Patent Application JP 4-141234 (A). The methanol reforming catalyst is usually charged into the reforming reaction space in the form of bulk pellets.

A known fact concerning virtually all current methanol reforming catalysts is that, during the first operating hours, they experience a noticeable reduction in volume that results in a corresponding decrease of the specific activity of the catalyst material and thus of the efficiency of a methanol reforming reactor containing the catalyst.

In the case of a methanol reforming reactor of the initially mentioned type disclosed in Japanese Published Patent Application JP 63-310703 (A), the methanol reforming catalyst in the reforming reaction space is held under an applied pressure by means of a pressure-spring-loaded, movably arranged, gas-permeable cover plate. Before the start of a reforming reaction operation, a reduction reaction for the reforming catalyst situated in the reforming reaction space is carried out whose volume will then decrease. The spring-loaded cover plate compresses the catalyst material correspondingly and ensures in this manner that a dense packing of the bulk catalyst is maintained. The reduction reaction is a process required for the operation of a Cu catalyst. The decrease in volume occurring in this case is clearly lower than the decrease in volume which occurs during the normal reforming operation.

From British Published Patent Application GB 2 132 108 A, a methanol reforming reactor is known, in which for a fast start of the reactor, before the beginning of the reforming operation phase, the reforming catalyst situated in the reaction space is directly and indirectly heated in that methanol is burned in air and the combustion exhaust gas is guided through a tempering space which is in thermal contact with the reaction space as well as through the catalyst-filled reaction space itself. For the combustion operation, a stoichiometric or less than stoichiometric oxygen fraction can be selected, and, for avoiding an overheating of the catalyst, water can be sprayed into the combustion gas flow guided to the reaction space.

In German Patent Document DE 1 246 688, a methanol reforming reactor is disclosed that comprises a nickel catalyst bed and a zinc-copper catalyst bed which follows. The reforming reaction operation is periodically interrupted for catalyst treatment phases during which the catalyst system is regenerated by rinsing with a gas containing free oxygen at a raised temperature of preferably 150° C. to 450° and subsequently, as required, is subjected to a rinsing with a gas containing free hydrogen, in order to reactivate the nickel catalyst. The nickel catalyst is produced, for example, from a nickel salt, in which case, at the end of the production process, the final activation takes place by the reduction to metallic nickel in a hydrogen-containing or inert gas atmosphere during a treatment period of up to approximately 16 hours at a temperature of between 150° C. and 600° C. and a pressure of up to 14 bar. After this reduction, the nickel catalyst must no longer come in contact with air in order to prevent an oxidation of the nickel.

The present invention is based on the technical problem of providing a methanol reforming reactor that exhibits no noticeable decrease of its efficiency in the first hours of operation because of a reduction of the specific catalyst activity caused by the decrease in volume of the methanol reforming catalyst, as well as a process by which a methanol reforming catalyst can be treated such that it is suitable for such a reactor.

In the case of a methanol reforming reactor according to the present invention, when the reforming reaction operation starts, the methanol reforming catalyst is already present in a pre-aged condition in the reforming reaction space. The typical decrease in volume of the catalyst material therefore has already taken place during the pre-aging process. The pre-aging can take place before the catalyst material is charged in the reaction space or within the reaction space. When the pre-aging takes place in the reaction space, catalyst material is refilled in order to compensate the decrease in volume and thus maintain the starting volume of the catalyst. When the reforming reaction operation is started in this manner, no noticeable decrease in volume of the catalyst material will occur so that correspondingly the conversion of the reactor decreases less than during starting with methanol reforming catalyst that was not pre-aged, specifically also in the initial reforming reaction operation. In addition, by means of the starting with already pre-aged catalyst material, no significant quantity of discharged catalyst material occurs in the reaction space which may otherwise cause damage to components of the reactor system that follow. This promotes a long service life of the reforming reactor.

In the case of the treatment process according to the present invention, the methanol reforming catalyst is treated for the purpose of a pre-aging in that it is treated in a methanol/water atmosphere at temperatures of between approximately 240° C. and approximately 350° C. and a load of between approximately 0.5 m³H₂/h and approximately 50 m³H₂/h per liter of catalyst material, in which case the heating operation typically takes several hours.

In the case of the methanol reforming reactor according to the present invention, a methanol reforming catalyst that is pre-aged according to the above process exists at the start of the reforming reaction operation in the reforming reaction space.

Representing numerous additional implementations of the invention, a methanol reforming reactor is mentioned as an example for the water vapor reforming of methanol, in the case of which a Cu/ZnO material is used as a catalytically active constituent which is situated, for example, on an aluminum oxide carrier. This Cu/ZnO/Al₂O₃ methanol reforming catalyst can be provided in a conventional manner, for example, in the form of pellets and can be charged into the reforming reaction space of the methanol reforming reactor as a catalyst pellet bulk. Such methanol reforming reactors are known in various types and therefore do not have to be explained in detail and shown in drawings.

Before the start of the reforming reaction operation by means of the reactor, the methanol reforming catalyst is subjected to a pre-aging process. This can take place outside the reforming reaction space or within it. When the pre-aging takes place within the reactor space, catalyst material is refilled several times during the pre-aging process in order to compensate the occurring decrease in volume. The pre-aging process consists of a treatment of the Cu/ZnO catalyst at temperatures of between approximately 240° C. and approximately 350° C. for several hours in a methanol/water vapor atmosphere at a load of between approximately 0.5 m³H$_2$/h and approximately 50 m³H$_2$/h per liter of catalyst material. As the load increases, the required process duration for the pre-aging will be reduced.

By means of the pre-aging process, the catalyst material experiences the typical initial decrease in volume. It was found that the selected process conditions ensure that the pre-aged Cu/ZnO methanol reforming catalyst present at the end of the process exists in an essentially completely reduced state; its volume will no longer be noticeably reduced during the subsequent use for the catalyzing of the methanol reforming reaction. It is understood that the process conditions for achieving this pre-aging condition with an essentially complete volume reduction are appropriately adjusted according to the application and particularly according to the specifically present catalyst material. In this case, the catalyst material is preferably reduced to the smallest achievable volume.

After the conclusion of the pre-aging process, the pre-aged methanol reforming catalyst is filled into the reforming reaction space, unless it was pre-aged there. In this case, the catalyst must either be transported in an inert atmosphere or must be reduced by means of a suitable conventional reduction reaction. A methanol reforming catalyst reduced in this manner, as required, can be stored for a later use in a closed container, whereby the pre-aging effect can be maintained.

As soon as the methanol reforming catalyst is present in this manner in the pre-aged condition in the reforming reaction space of the reactor, the reactor can be started for carrying out the reforming reaction operation, specifically for the water vapor reforming of methanol. The methanol reforming catalyst, which therefore already exists in an appropriately pre-aged state during this operating start, even in the first operating hours of the reactor, will no longer experience any significant decrease in volume. Correspondingly, the specific activity of the methanol reforming catalyst and thus the reaction conversion achieved by the reactor remain essentially constant even from the start of the reforming reaction operation without decreasing significantly.

Another advantage of the methanol reforming catalyst which is present in the pre-aged state in the reforming reaction space at the start of the reforming reaction operation is the fact that no significant amounts of dischargeable catalyst constituents will occur for the subsequent reforming reaction operation, which otherwise may damage reactor system components which follow.

The methanol reforming reactor according to the present invention, among others, is particularly suitable for a use in fuel-cell-operated motor vehicles in order to generate the hydrogen required for the fuel cells by the water vapor reforming of methanol carried along in the liquid state.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for treating a methanol reforming catalyst, comprising:

pre-aging a methanol reforming catalyst by treating the catalyst in a methanol and water atmosphere at a temperature between about 240° C. and about 350° C. and at a load between about 0.5 m³H$_2$/h and about 50 m³H$_2$/h per liter of catalyst material until an initial noticeable volume reduction is stopped; and catalyzing a methanol reforming reaction with the volume-reduced, pre-aged catalyst.

2. The process according to claim 1, wherein said treating is for several hours.

3. A fuel cell using the process of claim 1.

4. A motor vehicle using the process of claim 1.

5. A process for filling a methanol reforming reactor with a catalyst, comprising:

adding a methanol reforming catalyst into a reforming reaction space;

pre-aging the methanol reforming catalyst until an initial volume reduction stops; and simultaneously adding additional methanol reforming catalyst to the reaction space to compensate for the reduction in volume of the pre-aged methanol reforming catalyst.

6. A method of providing a methanol reforming reactor with a volume-reduced, pre-aged catalyst, comprising:

filling the reactor with a first quantity of methanol reforming catalyst;

pre-aging the first quantity of the catalyst until a volume reduction of the catalyst is stopped, thereby obtaining the volume-reduced, pre-aged catalyst; and filling the reactor with a second quantity of methanol reforming catalyst to compensate for the volume reduction.

7. A method of providing a methanol reforming reactor with a volume-reduced, pre-aged catalyst, comprising:

pre-aging a methanol reforming catalyst until an initial volume reduction of the catalyst is stopped, thereby obtaining the volume-reduced, pre-aged catalyst; and filling the reactor with the volume-reduced, pre-aged catalyst.

* * * * *